(No Model.)

D. N. BAY & W. H. FOWLER.
NUT LOCK.

No. 363,196. Patented May 17, 1887

WITNESSES:
Fred G. Dieterich
Solon C. Kemon

INVENTOR:
D. N. Bay
W. H. Fowler
BY Munn & Co
ATTORNEYS.

UNITED STATES PATENT OFFICE.

DAVID N. BAY AND WILLIAM H. FOWLER, OF CAMBRIDGE, OHIO.

NUT-LOCK.

SPECIFICATION forming part of Letters Patent No. 363,196, dated May 17, 1887.

Application filed February 5, 1887. Serial No. 226,714. (No model.)

*To all whom it may concern:*

Be it known that we, DAVID N. BAY and WILLIAM H. FOWLER, of Cambridge, in the county of Guernsey and State of Ohio, have invented a new and useful Improvement in Nut-Locks, of which the following is a specification.

Our invention is an improvement in that class of nut-locking devices which are formed of a plate or bar having notches or slots in its ends and placed, in practical use, between two nuts, which enter the said slots and are thereby prevented from turning so long as the plate or bar is *in situ*.

Our improved nut-locking bar is formed of two parts which slide on each other and are held engaged with two adjacent nuts by means of a spring.

The details of construction and combination of parts are as hereinafter described.

In accompanying drawings we show the invention applied to the nuts of bolts employed for securing fish-plates to railroad-rails; but it is obviously adapted for use in other situations.

Figure 1:
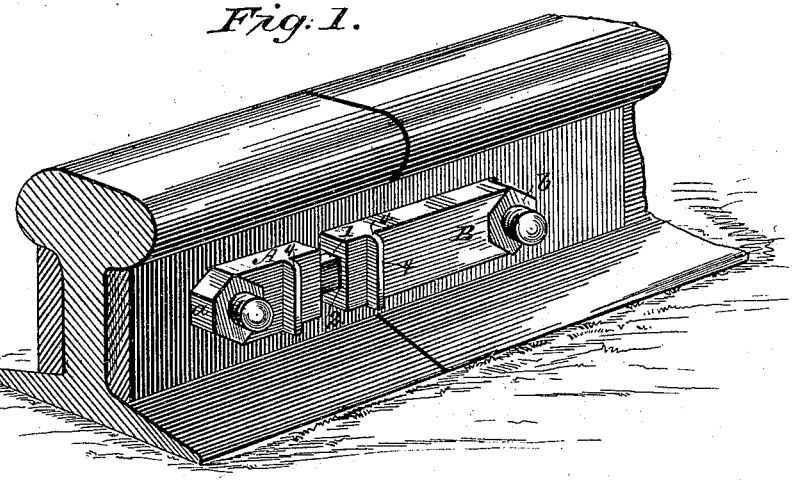
Figure 2:
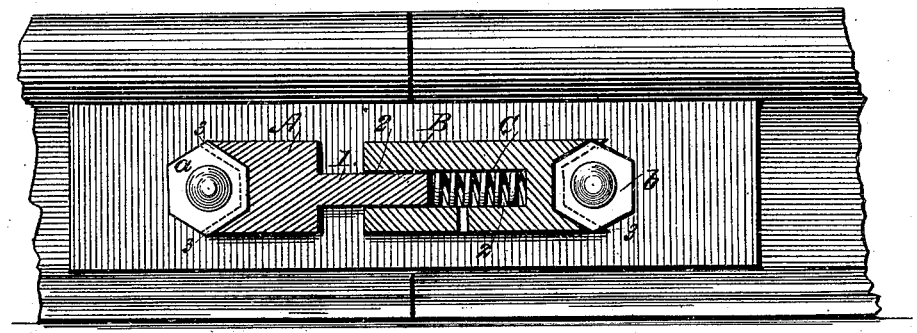
Figure 3:
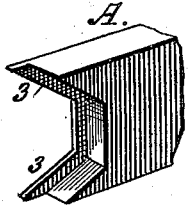

Figure 1 is a perspective view. Fig. 2 is a sectional elevation. Fig. 3 is a perspective view of a portion of the nut-locking device enlarged.

Our nut-locking device is composed of the two parts A and B and a spring, C. The part A consists of head having a recess or notch adapted to embrace half of a nut and provided with a shank, 1, which is reduced in thickness to adapt it to enter a mortise, 2, in the part B. The said mortise 2 is formed longitudinally in one end of part B, and the other end of the same is constructed like the head of part A, with a recess or notch adapted to embrace half of a nut, as shown. The parts A and B are made of the same form and have like proportions, save as to length, as shown. The shank 1 of part A is inserted and slides freely in the mortise 2 of part B, as shown in Fig. 2, and thus the parts A and B may be readily adjusted nearer together or farther apart, as required. Practically, however, the adjustment depends on the distance between the two adjacent nuts to be locked, and when applied as shown Fig. 2 the end socket of part A embraces the left-hand nut, *a*, and the socket of part B the right-hand nut, *b*.

A spiral spring, C, is placed in the mortise 3 of part B to hold the nuts *a b* securely locked. In other words, the pressure of the spring against the end of shank 1 of part A holds parts A B separated as widely as the distance between the nuts permits.

It may be remarked here that the form of the nuts and the sockets of the locking-bar A B is shown as hexagonal, and of course this correspondence would always be maintained whatever may be the polygonal shape of the nuts.

It is obvious that the two-part nut-locking bar would tend to jar off the nuts *a b* if not secured by some other agency than friction. We therefore construct the end or nut sockets of the parts A B with lips or flanges 3, as shown in Fig. 3, which are formed on the rear sides of said parts and take under the nuts, whose inner faces, being slightly conical, do not lie in close contact with the fish-plates, save at a point immediately surrounding the bolts.

In order to apply and remove our locking device from nuts *a b* with ease and dispatch, we construct each of the parts A B with a transverse rib or flange, 4, on its outer side, and these serve in practice as points of contact or bearing for the jaws of large tongs, (not shown,) by which the parts A B may be forced together against the stress of spring C. To allow more ready escape of water that may chance to enter the mortise 2, a hole is in practice bored in the lower side of part B, so as to communicate with the mortise at its inner end.

What we claim is—

1. The combination of the following elements: the parts A and B, which are held in alignment and also slide on each other and whose outer ends are constructed in the form of a nut-socket, and a spring which is interposed between said parts and tends to separate them, as and for the purpose specified.

2. The combination, with the part B, having a lengthwise mortise, 2, and the spring C, placed in the latter, of the part A, having shank 1, adapted to slide freely in the mortise, each of said parts having a nut-socket formed in one end, as shown and described.

DAVID N. BAY.
WILLIAM H. FOWLER.

Witnesses:
JAMES A. DAVIS,
R. T. SCOTT.